United States Patent [19]
Yamaguchi

[11] Patent Number: 5,485,969
[45] Date of Patent: Jan. 23, 1996

[54] REVERSE ROTATION PREVENTIVE MECHANISM FOR FISHING REEL

[75] Inventor: Nobuyuki Yamaguchi, Tokyo, Japan

[73] Assignee: Daiwa Seiko, Inc., Tokyo, Japan

[21] Appl. No.: 114,337

[22] Filed: Aug. 31, 1993

[30] Foreign Application Priority Data

Sep. 1, 1992 [JP] Japan .................. 4-067063 U

[51] Int. Cl.⁶ .................. A01K 89/01; F16D 55/02
[52] U.S. Cl. .................. 242/247; 188/71.2
[58] Field of Search .................. 242/243, 244, 242/247, 298, 299, 300; 188/71.2

[56] References Cited

U.S. PATENT DOCUMENTS

| | | | |
|---|---|---|---|
| 3,034,741 | 5/1962 | Macy et al. | 242/244 X |
| 3,044,730 | 7/1962 | Yeada | 242/247 |
| 4,163,528 | 8/1979 | Egasaki et al. | 242/300 |
| 4,288,046 | 9/1981 | Morimoto et al. | 242/247 |
| 4,614,314 | 9/1986 | Ban | 242/300 X |
| 4,832,279 | 5/1989 | Maruyama | 242/247 |
| 4,919,361 | 4/1990 | Kobayashi | 242/247 X |
| 5,020,738 | 6/1991 | Yamaguchi | 242/247 X |
| 5,042,741 | 8/1991 | Aota | 242/247 X |
| 5,221,057 | 6/1993 | Yashikawa | 242/247 |
| 5,299,757 | 4/1994 | Sugawara | 242/248 |

FOREIGN PATENT DOCUMENTS

| | | |
|---|---|---|
| 0440231 | 8/1991 | European Pat. Off. ........ 242/247 |
| 55-38380 | 9/1980 | Japan .................. 242/247 |
| 62-181166 | 11/1987 | Japan . |
| 64-38964 | 3/1989 | Japan . |
| 3-102852 | 10/1991 | Japan . |

*Primary Examiner*—Daniel P. Stodola
*Assistant Examiner*—Michael R. Mansen
*Attorney, Agent, or Firm*—Longacre & White

[57] ABSTRACT

A reverse rotation preventive mechanism for preventing the reverse rotation of a rotor of a fishing reel. A frictional engagement member and a disk are provided for preventing the reverse rotation of the rotor with their mutually contactable surfaces having directional characteristic when the torque of the reverse rotation is low, and a swingable claw and a rachet are provided for preventing the reverse rotation of the rotor when the torque of the reverse rotation is high. The reverse rotation of the rotor can be hindered and stopped at initial stage without any undesired idle rotation. Even if the torque is high, the claw and the rachet are engaged with each other to surely prevent the further reverse rotation.

11 Claims, 12 Drawing Sheets

REVERSE ROTATION PREVENTIVE MECHANISM FOR FISHING REEL

BACKGROUND OF THE INVENTION

The present invention relates to a reverse rotation preventive mechanism for a fishing reel, which includes a high-power reverse rotation preventive means and a low-power reverse rotation preventive means and is operated so that a rotary member rotatably supported by the casing of the reel is either allowed to be rotated both forward and backward or reversely, or allowed to be rotated only forward.

In a conventional reverse rotation preventive mechanism for a fishing reel, an engagement claw is engaged with a ratchet to prevent the rotor of the reel from being rotated backward or reversely, and is disengaged from the ratchet to allow the rotor to be rotated both forward and backward or reversely, as disclosed in the Japan Utility Model Application (OPI) No. 181166/87 (the term "OPI" as used herein means an "unexamined published application").

Another conventional reverse rotation preventive mechanism for a fishing reel includes a one-way clutch having rolling elements whose wedge effects are utilized to prevent the rotor of the reel from being rotated backward or reversely, as disclosed in the Japan Utility Model Applications (OPI) Nos. 38964/89 and 102852/91.

However, the quantity of the unavoidable backward or reverse rotation of the rotor at the time of the prevention of the backward or reverse rotation thereof by the former conventional reverse rotation preventive mechanism is relatively large to let a fishline loosen to make it impossible to smoothly and securely perform fishing manipulation.

Since the wedge effects of the rolling elements are utilized for the prevention of the backward or reverse rotation of the rotor by the latter conventional reverse rotation preventive mechanism, the quantity of the unavoidable backward or reverse rotation of the rotor at the time of the prevention is minimized to preclude the loosening of a fishline to improve the hooking property. However, since the one-way clutch is made of steel to have enough strength and durability to withstand the wedge effects, the clutch is high in cost and likely to rust with water or sea water in poor maintenance so as to deteriorate the wedge effects to cause an unstable action.

SUMMARY OF THE INVENTION

The present invention was made in order to solve the above-mentioned problems.

Accordingly, it is an object of the invention to provide a reverse rotation preventive mechanism for a fishing reel, which can surely and stably prevent a reverse rotation of a rotary member and which can cope with the reverse rotation at an initial stage or a low load stage thereof without unwanted idle reverse rotation to improve the hooking property.

In order to attain the above-noted and other objects, the present invention provides a reverse rotation preventive mechanism which is for a fishing reel and includes a first reverse rotation preventive means for preventing the backward or reverse rotation of the rotary member of the reel if the torque of the reverse rotation is relatively low, and a second reverse rotation preventive means for preventing the reverse rotation if the torque is too high for the first means to prevent the reverse rotation. It is preferable that the first means is of a type which utilizes the wedge effect, and the second means is of a claw-type.

The reverse rotation of the rotary member of the reel is hindered and stopped by the first reverse rotation preventive means at the initial or low load stage of the rotation so that the unwanted idle rotation is avoided. Thus, the hooking property of the reel can be improved. Even if the power or torque of the reverse rotation is too high for the first reverse rotation preventive means to stop it, the rotation is surely stopped by the second reverse rotation preventive means after the initial stage of the rotation. Since the heavy load or torque is owed by the second rotation preventive means, the first reverse rotation preventive means can be manufactured with non-steel material or low specific-gravity material to reduce the weight and cost thereof.

DETAILED DESCRIPTION OF THE PREFERRED EMBODIMENTS

Embodiments of the present invention are hereafter described with reference to the drawings attached hereto.

Figure 1:
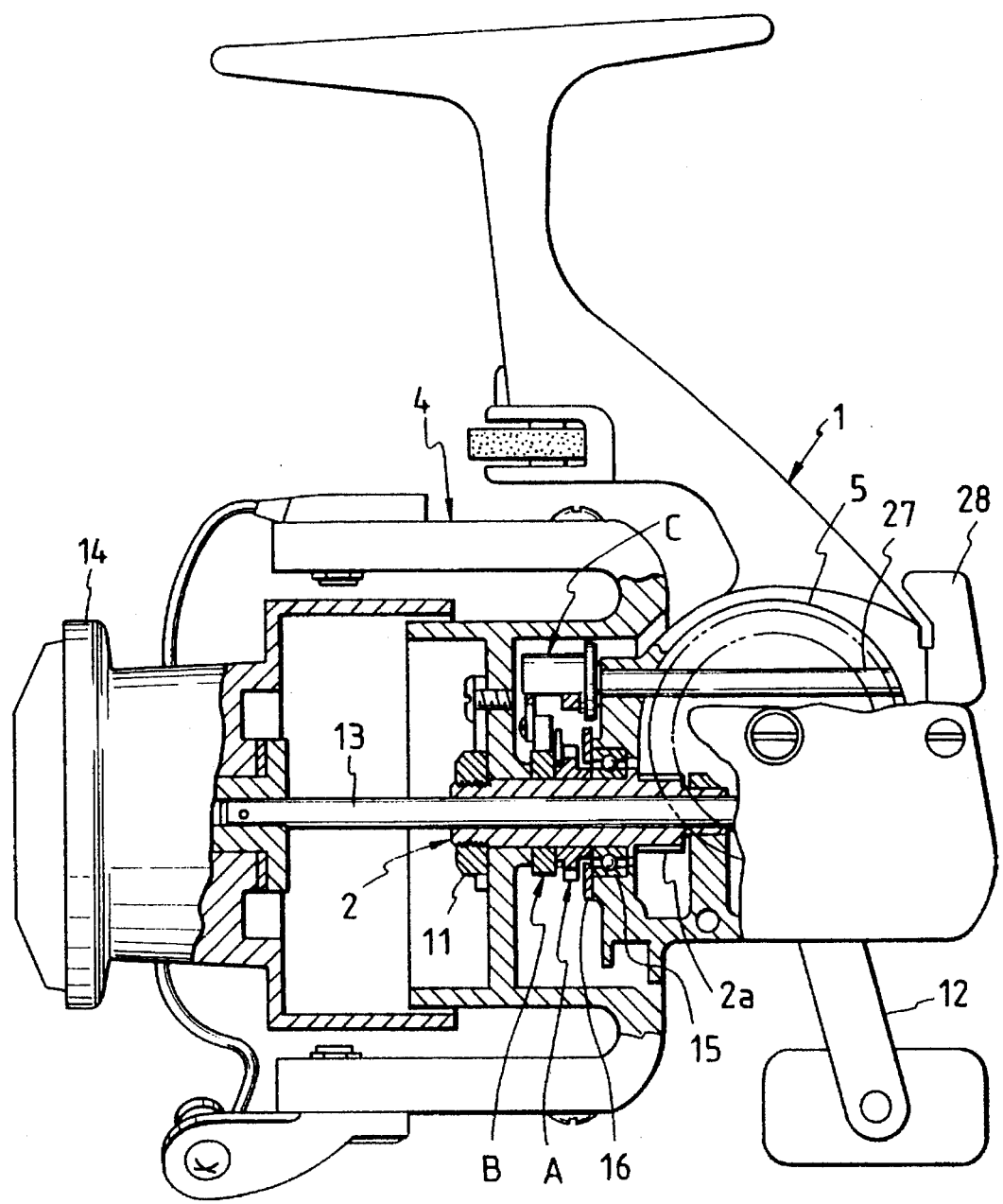
FIG. 1 is a cutaway side view of a spinning reel which is for fishing and includes a reverse rotation preventive mechanism which is an embodiment of the present invention.
Figure 2:
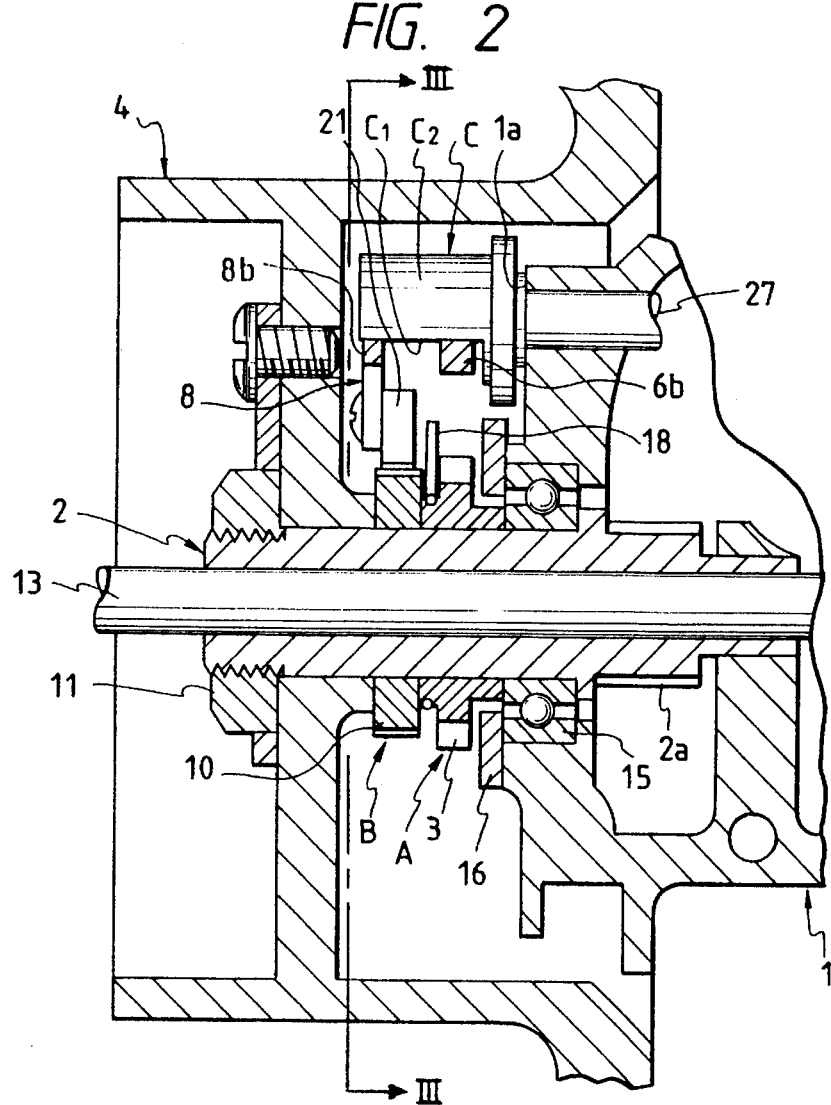
FIG. 2 is a longitudinally sectional view of a major part of the reel.
Figure 4:
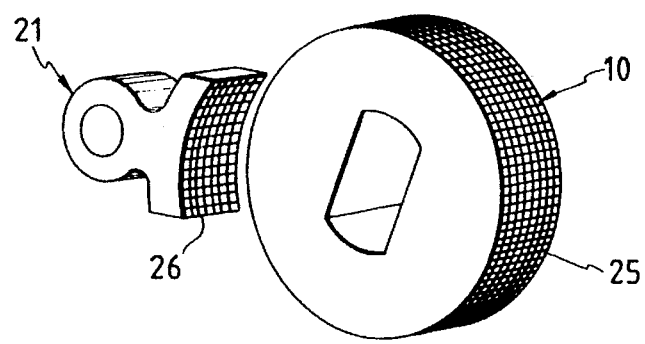
FIG. 4 is an exploded perspective view of a major part of the mechanism.
Figure 3:
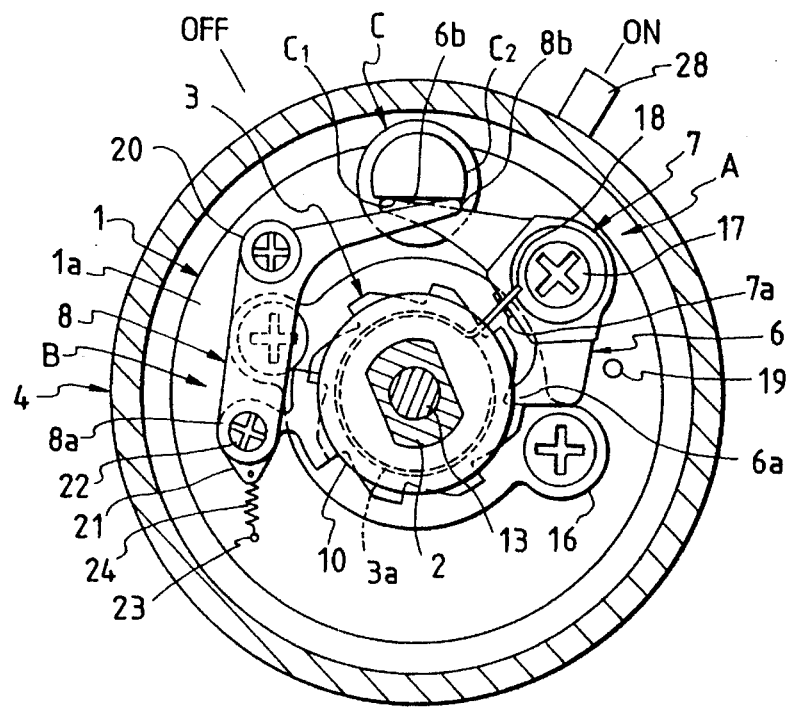
FIG. 3 is a cross-sectional view of the part to illustrate the operation of the mechanism that it prevents the backward or reverse rotation of the rotor of the reel.
Figure 5:
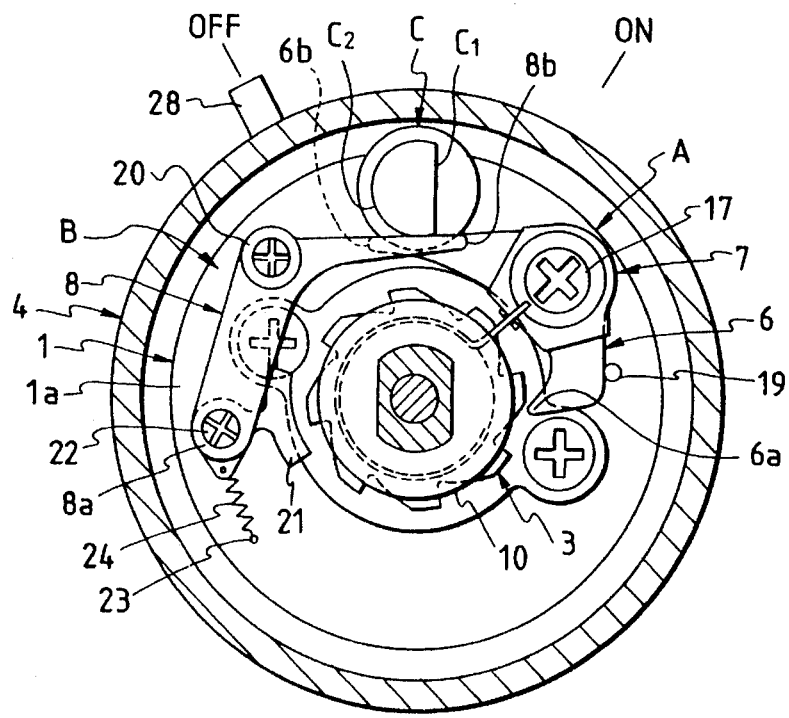
FIG. 5 is a cross-sectional view of the major part of the reel to illustrate the operation of the mechanism that it does not prevent the backward or reverse rotation of the rotor.

FIGS. 1, 2, 3, 4 and 5 show a reverse rotation preventive mechanism which is one of the embodiments and is for preventing the backward or reverse rotation of a rotor of a spinning reel for fishing. FIG. 1 is a cutaway side view of the reel. FIG. 2 is a longitudinally sectional view of a major part of the reel. FIG. 3 is a cross-sectional view of the part to illustrate the operation of the mechanism that it prevents the backward or reverse rotation of the rotor. FIG. 4 is an exploded perspective view of a major part of the mechanism. FIG. 5 is a cross-sectional view of the major part of the reel to illustrate the operation of the mechanism that it does not prevent the backward or reverse rotation of the rotor.

The spinning reel includes a casing 1, a drive quill 2, a pinion 2a, a rotor 4, a drive gear 5, a nut 11, a handle 12, a spool shaft 13, a spool 14, a bearing 15, and a stop plate 16.

The reverse rotation preventive mechanism includes a first reverse rotation preventive means B, a second reverse rotation preventive means A, a cam means C, a manipulation bar 27, and a stoppage knob 28.

The drive quill 2 projects forward from the front portion 1a of the casing 1. The reverse rotation preventive ratchet 3 of the second reverse rotation preventive means A and the engagement disk 10 of the first reverse rotation preventive means B are mounted on the drive quill 2 in front of the front portion 1a of the casing so that the ratchet and the disk are unrotatable relative to the quill. The rotor 4 is mounted on the quill 2 in front of the disk 10 so that the rotor is unrotatable relative to the quill. The nut 11 is tightened on the quill 2 and the rotor 4 to secure them to each other. The pinion 2a is provided on the quill 2 and engaged with the drive gear 5 so that the rotor 4 is rotated through the gear and the pinion by turning the handle 12. The spool shaft 13 passes through the quill 2, and projects forward therefrom. The spool 14 is mounted on the spool shaft 13 at the front end thereof so that they are reciprocated together backward and forward by turning the handle 12. The bearing 15 is fitted in the front portion 1a of the casing 1 and mounted on the quill 2 for support the quill to the casing. The stop plate 16 is secured to the front portion 1a to keep bearing 15 from coming off.

The second reverse rotation preventive means A includes the reverse rotation preventive ratchet 3, a reverse rotation preventive engagement claw 6, an engagement plate 7, and a friction spring 18. The claw 6 is supported in a swingable manner by a screw 17 in the right half of the front portion 1a of the casing 1 so that the tip portion 6a of the claw confronts the tooth of the ratchet 3 and can be engaged therewith and disengaged therefrom, as shown in FIGS. 3 and 5. The friction spring 18 is fitted in the groove of the peripheral surface of the central portion 3a of the ratchet 3. The engagement plate 7 is provided on the claw 6. The spring 18 is fitted at one end thereof in the opening 7a of the plate 7 so that the swinging motion of the claw 6 is associated with the rotational motion of the rotor 4 (described later). The second means A also includes a swing stoppage pin 19 secured to the casing 1 near outside the tip portion 6a of the claw 6.

The first reverse rotation preventive means B includes a lever 8 supported in a swingable manner by a screw 20 in the left half of the front portion 1a of the casing 1. A reverse rotation preventive frictional engagement member 21 is supported in a swingable manner by a screw 22 at one end 8a of the lever 8 so as to confront the peripheral surface of the engagement disk 10. A spring 24 is engaged at one end thereof with the reverse rotation preventive frictional engagement member 21 and at the other end of the spring with a pin 23 secured to the front portion of the casing. The engagement disk 10 and the engagement member 21 are provided with engagement portions 25 and 26 having directional characteristic, respectively, as shown in FIG. 4. The portions 25 and 26 are formed, for instance, in such a manner that a cloth on which numerous hook-shaped filaments made of a synthetic resin are planted is stuck to each of the peripheral surface of the body of the disk 10 and the arc-shaped surface of the body of the member 21. The mutual engagement of the portions 25 and 26 is so directional that the hook-shaped filaments thereof are engaged with each other when the disk 10 is rotated counterclockwise as to FIG. 4, and that the filaments are not engaged with each other when the disk is rotated clockwise as to FIG. 4.

The claw 6 is formed with a tip portion 6a at one end thereof and an operating portion 6b at the other end thereof.

The lever 8 is formed with an operating portion 8b at the other end thereof, opposite from the end where the reverse rotation preventive frictional engagement member 21 is swingably provided.

The cam means C is provided in the upper half of the front portion 1a of the casing 1, and includes a reverse rotation preventive flat surface C1 and a reverse rotation allowing convex surface C2, either of which can be put into contact with the operating portions 6b and 8b of the claw 6 and the lever 8.

The manipulation bar 27 is horizontally supported by the casing 1. The stoppage knob 28 is attached to the bar 27 at the rear end thereof. The cam means C is secured to the bar 27 at the front end thereof. A spring not shown in the drawings urges the bar 27 or the cam means C so that the knob 28 can be put, with a stop click, in either of a reverse rotation preventive position, i.e. ON position, and a reverse rotation allowing position, i.e. OFF position, different by an angle of 90 degrees from the former position counterclockwise as to FIGS. 3 and 5.

When the knob 28 is put in the reverse rotation preventive position as shown in FIG. 3, the operating portion 6b of the reverse rotation preventive engagement claw 6 of the second reverse rotation preventive means A and the operating portion 8b of the lever 8 of the first reverse rotation preventive means B are located on the reverse rotation preventive flat surface C1 of the cam means C so that the tip portion 6a of the claw can be engaged with the tooth of the reverse rotation preventive ratchet 3, and the reverse rotation preventive frictional engagement member 21 of the first means is put in contact with the peripheral surface of the disk 10 and can be engaged therewith.

When the knob 28 is put in the reverse rotation allowing position as shown in FIG. 5, the reverse rotation allowing convex surface C2 of the cam means C pushes down the operating portions 6b and 8b of the claw 6 and the lever 8 so that the tip portion 6a of the claw is located away from the tooth of the ratchet 3, and the engagement member 21 is located away from the disk 10.

When the handle 12 is turned forward to wind a fishline on the spool 14 by the rotor 4 as the knob 28 is in the reverse rotation preventive position as shown in FIG. 3, the rotor is rotated forward, i.e. clockwise as to the drawing, so that the engagement disk 10 of the first reverse rotation preventive means B is rotated clockwise together with the rotor. Since the hook-shaped filaments of the disk 10 are not engaged with those of the engagement member 21 of the means and the friction spring 18 of the second reverse rotation preventive means A is rotated clockwise so as to, in turn, rotate the reverse rotation preventive engagement claw 6 thereof counterclockwise until coming into contact with the swing stoppage pin 19 and keep the engagement claw 6 away from the reverse rotation preventive ratchet 3 of the means, the rotor 4 can be rotated forward further.

When the fishline is unwound from the spool 14 by the pull of a fish so that the rotor 4 is rotated backward or reversely, i.e. counterclockwise, under a condition shown FIG. 3, the hook-shaped filaments of the frictional engagement member 21 of the first reverse rotation preventive means B are put into contact with those of the engagement disk 10 thereof and engaged therewith to stop or brake the backward or reverse rotation of the rotor. At the same time, the friction spring 18 is rotated counterclockwise so that the engagement claw 6 of the second means A is swung clockwise and the tip portion 6a of the claw is engaged with the tooth of the ratchet 3 of the means to stop the backward or reverse rotation of the rotor 4.

The stoppage or braking against the backward or reverse rotation of the rotor 4 by the engagement of the hook-shaped filaments of the engagement member 21 and engagement disk 10 of the first reverse rotation preventive means B takes place more quickly than the engagement of the tip portion 6a of the claw 6 of the second reverse rotation preventive means A with the tooth of the ratchet 3 thereof. However, since the power of the stoppage or braking of the first means B is relatively low, the filaments slip on each other along with the engagement thereof if the power of the backward or reverse rotation is high. When the slip has lasted for an angle, the tip portion 6a of the claw 6 is engaged with the tooth of the ratchet 3 to stop the backward or reverse rotation of the rotor 4. The backward or reverse rotation of the rotor is thus stopped or braked by the first reverse rotation preventive means B at the initial stage of the rotation, and stopped by the second reverse rotation preventive means A after the initial stage if the rotation is not stopped by the first means because of the high power of the rotation.

When the knob 28 is put in the reverse rotation allowing position as shown in FIG. 5, the reverse rotation allowing convex surface C2 of the cam means C pushes down the operating portion 6b of the claw 6 of the second reverse rotation preventive means A and the operating portion 8b of the lever 8 of the first reverse rotation preventive means B so that the tip portion 6a of the claw is located away from the ratchet 3 of the second means, and the frictional engagement member 21 of the first means is located away from the peripheral surface of the engagement disk 10 of the first means. As a result, the rotor 4 is allowed to be rotated both forward and backward or reversely.

As described above, if the power of the backward or reverse rotation of the rotor 4 is low, the rotation can be stopped by the first reverse rotation preventive means B at the initial stage of the rotation to quickly cope with it to preclude the loosening of the fishline or the idle rotation of the rotor to improve the hooking property of the reel. Even if the power is too high for the first means B to stop the rotation, it can be surely stopped after the initial stage by the second reverse rotation preventive means A.

Since the first reverse rotation preventive means B may not bear against the heavy or large torque of the reverse rotation, the first means can be manufactured with the low-cost or light-weight material in comparison with a conventional reverse rotation preventive means having steel-made rolling elements whose wedge effects are utilized for the prevention of reverse rotation.

Although the engagement disk 10 and engagement member 21 of the first means B in the above-noted embodiment have the engagement portions 25 and 26 having the J-shaped filaments made of the synthetic resin, the present invention is not confined thereto or thereby. For example, it is possible to construct the first means B such that the disk 10 has small projections on the peripheral surface of the body of the disk whereas the member 21 has small projections on the arc-shaped surface of the member so that the projections are engaged with each other at the time of the counterclockwise rotation of the disk as to FIG. 4, and not engaged with each other at the time of the clockwise rotation of the disk as to FIG. 4.

Figure 6:
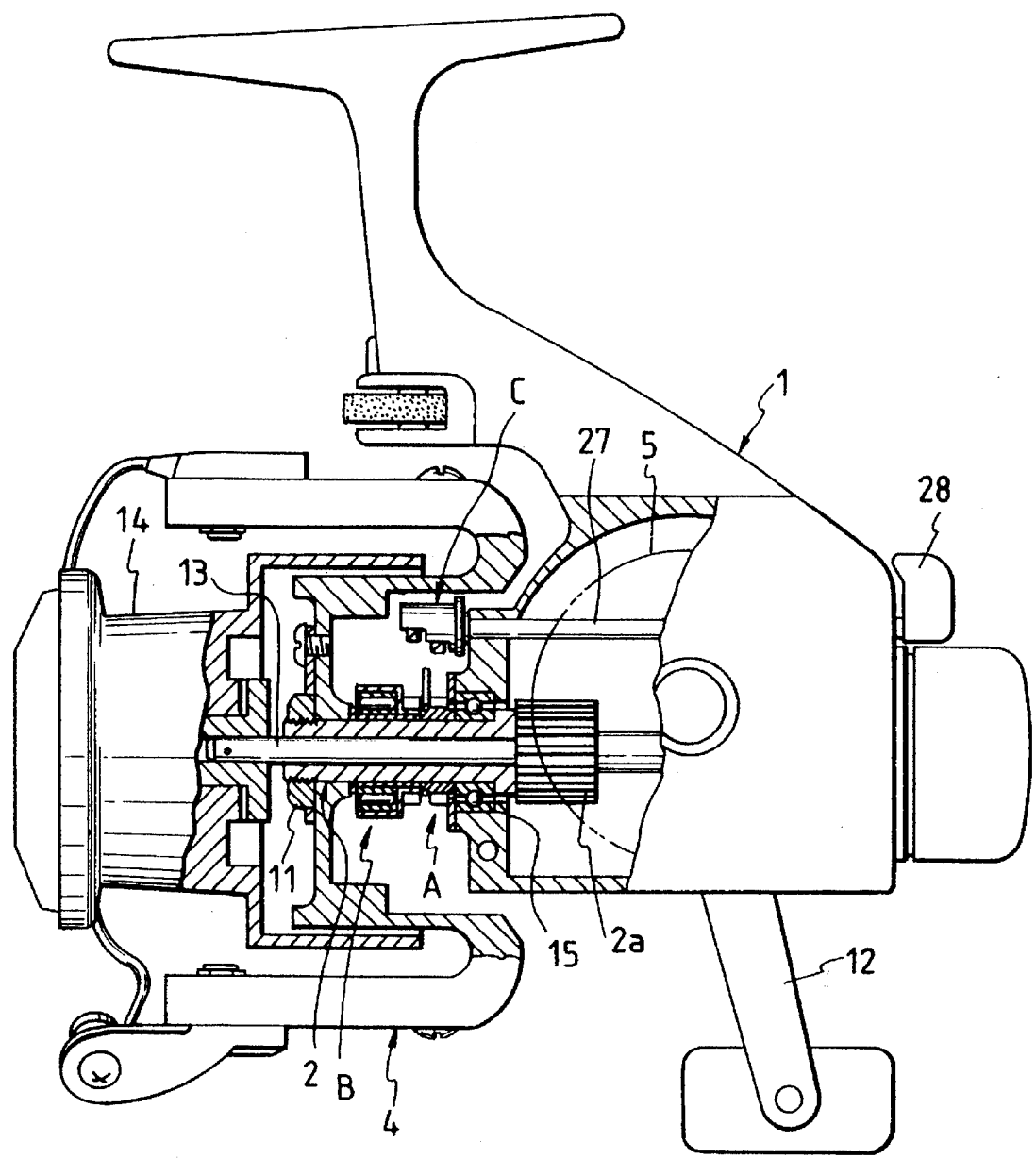
FIG. 6 is a cutaway side view of a spinning reel which is for fishing and includes a reverse rotation preventive mechanism which is another embodiment of the invention.
Figure 7:
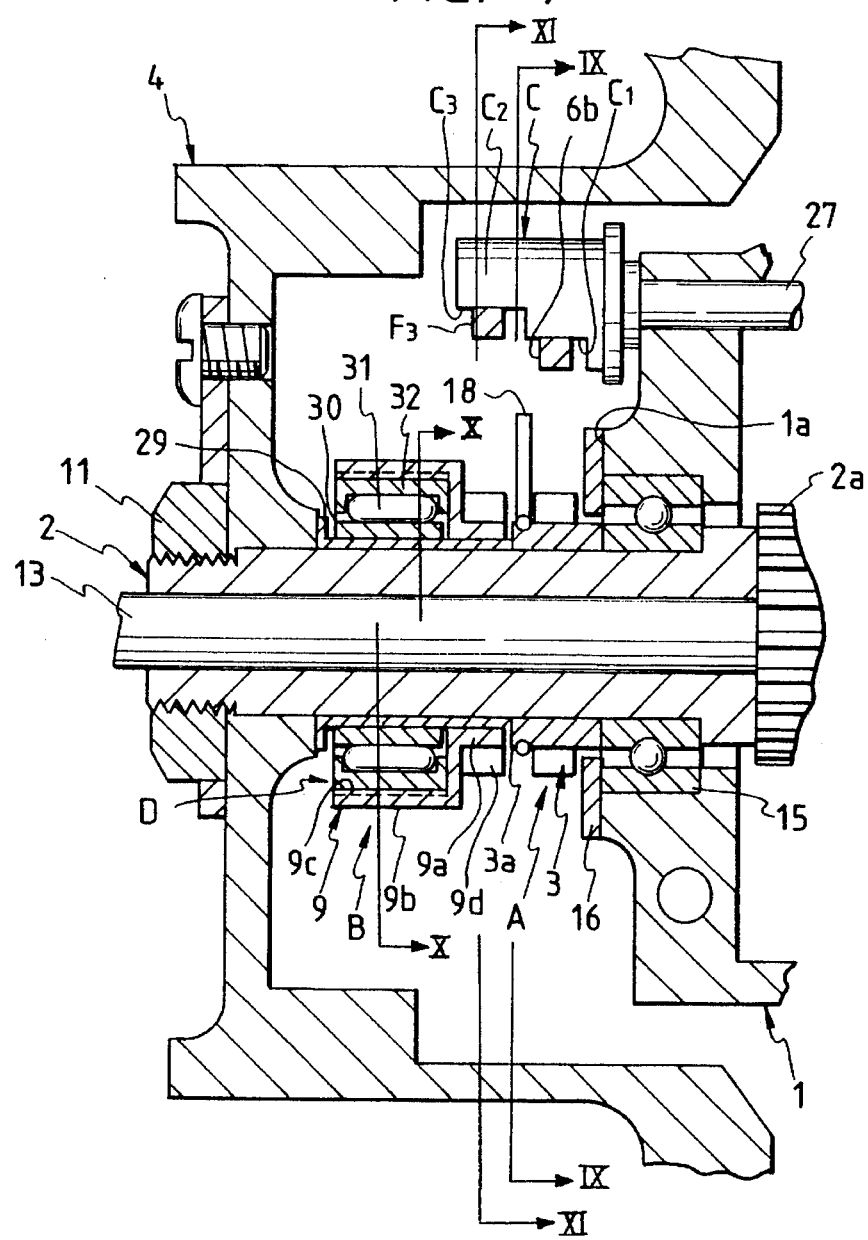
FIG. 7 is a longitudinally sectional view of a major part of the reel.
Figure 8:
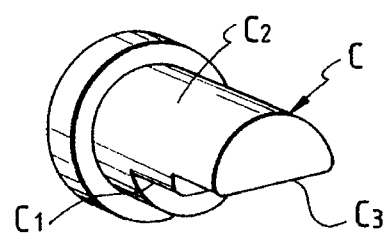
FIG. 8 is a perspective view of the cam means of the mechanism.
Figure 9:
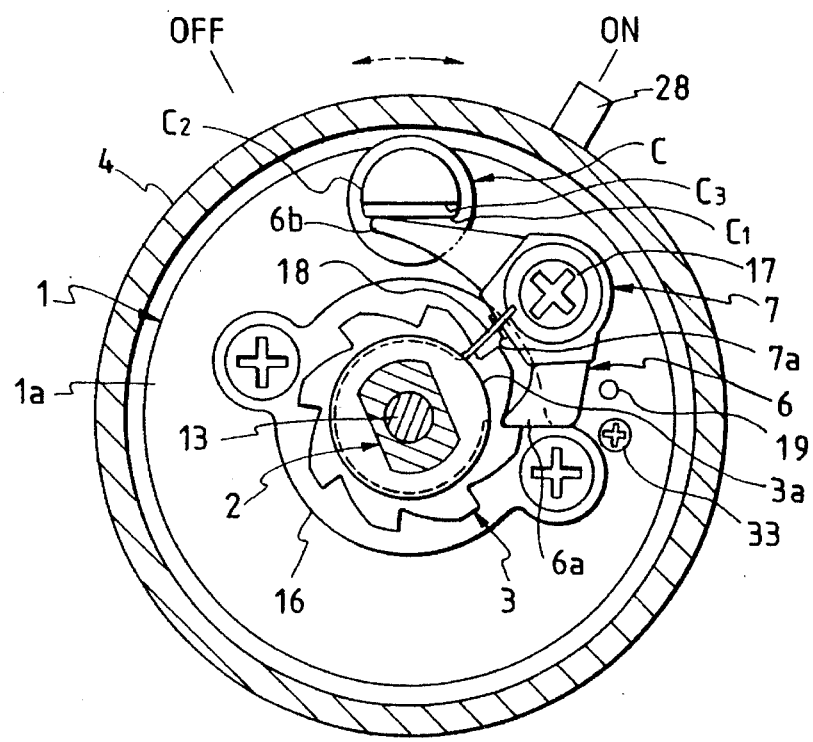
FIG. 9 is a cross-sectional view of the reel to illustrate the operation of the mechanism that the stoppage knob thereof is in a reverse rotation preventive position.
Figure 10:
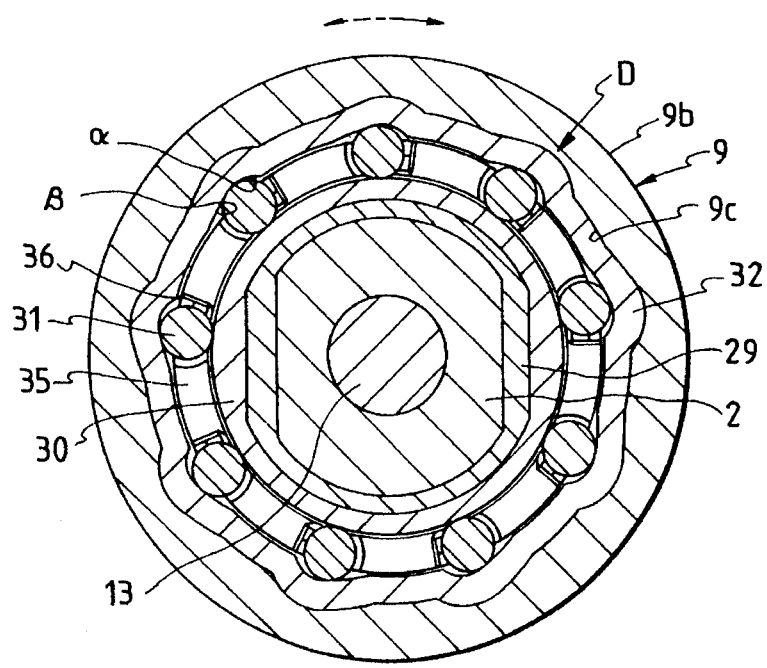
FIG. 10 is a cross-sectional view of the rolling-element-type one-way clutch of the mechanism.
Figure 11:
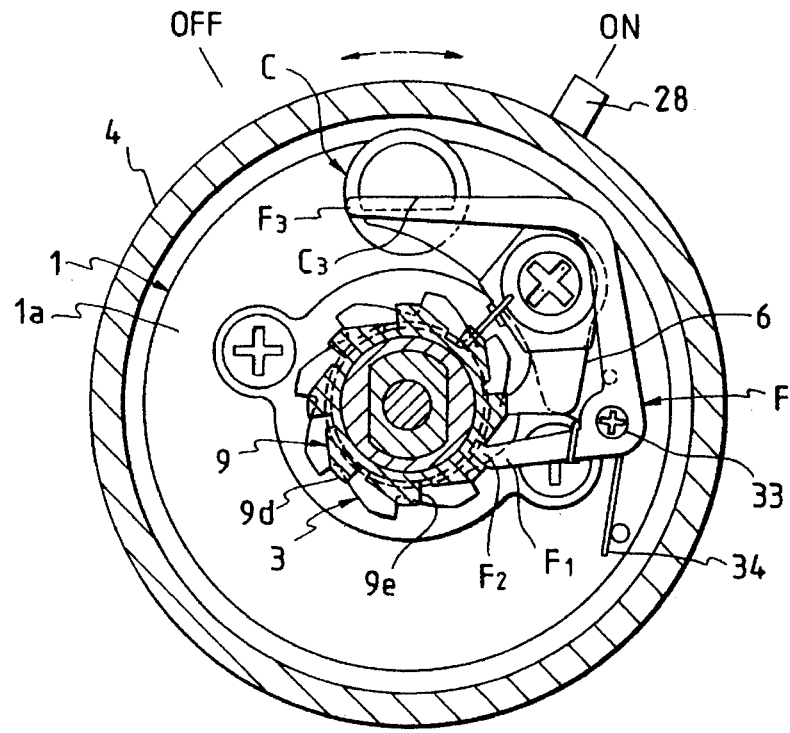
FIG. 11 is a cross-sectional view of the reel to illustrate the operation of the mechanism that the stoppage knob is in the position.
Figure 12:
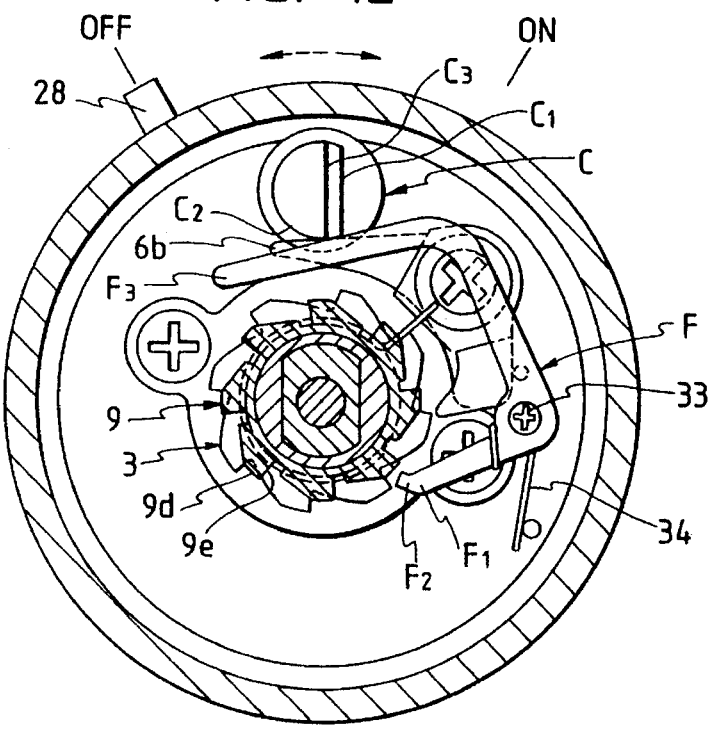
FIG. 12 is a cross-sectional view of the reel to illustrate the operation of the mechanism that the stoppage knob is in a reverse rotation allowing position.

FIGS. 6-12 show a reverse rotation preventive mechanism which is another of the embodiments and is for preventing the backward or reverse rotation of the rotor of a spinning reel for fishing. FIG. 6 is a cutaway side view of the reel. FIG. 7 is an enlarged longitudinally sectional view of a major part of the reel. FIG. 8 is a perspective view of the cam means of the mechanism. FIG. 9 is a cross-sectional view of the reel to illustrate the operation of the mechanism that the stoppage knob thereof is in a reverse rotation preventive position, i.e. On position. FIG. 10 is a cross-sectional view of the rolling-element-type one-way clutch of the mechanism. FIG. 11 is a cross-sectional view of the reel to illustrate the operation of the mechanism that the stoppage knob is in the ON position. FIG. 12 is a cross-sectional view of the reel to illustrate the operation of the mechanism that the stoppage knob is in a reverse rotation allowing position, i.e. OFF position.

The spinning reel includes a casing 1, a drive quill 2, a pinion 2a, the rotor 4, a drive gear 5, a nut 11, a handle 12, a spool shaft 13, a spool 14, a bearing 15, and a stop plate 16.

The reverse rotation preventive mechanism includes a first reverse rotation preventive means B, a second reverse rotation preventive means A, a cam means C, a manipulation bar 27, and a stoppage knob 28.

The drive quill 2 projects forward from the front portion 1a of the casing 1 of the reel. The reverse rotation preventive ratchet 3 of the second reverse rotation preventive means A and the flanged collar 29 of the first reverse rotation preventive means B are mounted on the quill 2 in front of the casing 1 so that the ratchet and the collar are unrotatable relative to the quill. The rotor 4 is mounted on the quill 2 in front of the collar 29 so that the rotor is unrotatable relative to the quill. The nut 11 is tightened on the quill 2 and the rotor 4 to secure them to each other. The pinion 2a is provided on the quill 2 and engaged with the drive gear 5 so that the rotor 4 is rotated through the gear and the pinion by turning the handle 12. The spool shaft 13 passes through the quill 2, and projects forward therefrom. The spool 14 is mounted on the spool shaft 13 at the front end thereof so that they are reciprocated together backward and forward by turning the handle 12. The bearing 15 is fitted in the front portion 1a of the casing 1 and mounted on the quill 2 to support it. The stop plate 16 is secured to the front portion 1a in front of the bearing 15 to keep it from coming off.

The second reverse rotation preventive means A includes the reverse rotation preventive ratchet 3, a reverse rotation preventive engagement claw 6, an engagement plate 7, and a friction spring 18. The claw 6 is supported in a swingable manner by a screw 17 in the right half of the front portion 1a of the casing 1 so that the tip portion 6a of the claw is opposed to the tooth of the ratchet 3 and can be engaged therewith and disengaged therefrom, as shown in FIG. 9. The friction spring 18 is fitted in the groove of the peripheral surface of the central portion 3a of the ratchet 3. The engagement plate 7 is provided on the claw 6. The spring 18 is fitted at one end thereof in the opening 7a of the plate 7 so that the swinging motion of the claw 6 is associated with the rotation of the rotor 4. The means A also includes a swing stop pin 19 secured to the casing 1 near outside the tip portion 6a of the claw 6.

The first reverse rotation preventive means B includes the rolling-element-type one-way clutch D, a housing 9, a reverse rotation preventive engagement member F, the flanged collar 29, and a spring 34.

The clutch D includes an inner race member 30, rod-shaped rolling elements 31, an outer race member 32, a retainer 35, and springs 36, as shown in FIG. 10. The clutch D is made of a synthetic resin. The inner race member 30 is mounted on the flanked collar 29 so that the race member is unrotatable thereto. The rolling elements 31 are rotatably fitted between inner and outer races of the members 30 and 32. The inner annular portion 9a of the housing 9 is rotatably fitted on the peripheral surface of the collar 29. The outer race member 32 is fitted in the recess 9c of the outer annular portion 9b of the housing 9. The housing 9 has an engagement portion 9d constituted by reverse rotation preventive teeth formed on the outer periphery of the inner annular portion 9a. The engagement member F is supported in a swingable manner by a screw 33 in the right half of the front portion 1a of the casing 1 so that the member is opposed to the engagement portion 9d of the housing 9 and can be engaged therewith and disengaged therefrom, as shown in FIGS. 11 and 12. The spring 34 urges the member F in such a direction as to engage the end of the member F with the portion 9d.

The rolling elements 31 are fitted in the respective through holes of the retainer 35 and retain therein. Each of the rolling elements 31 is urged by a spring 36 in a predetermined direction. The inner circumferential surface of the outer race member 32 defines free rolling areas α on which the rolling elements 31 freely roll, and rolling hindrance areas β with which the elements are put into contact to hinder their rolling.

The engagement portion 9d of the housing 9 has notches 9e. The tip portion F1 of the engagement member F has an engagement part F2, which can be engaged in one of the notches 9e. The part F2, the notches 9e and the spring 34, in combination, facilitate the positive engagement between the engagement portion 9d and tip portion F1 and function to keep the tip portion F1 from being disengaged from the engagement portion 9d of the housing.

The cam means C is provided in the upper half of the front portion 1a of the casing 1, as shown in FIGS. 9, 11 and 12. The cam means C includes a reverse rotation preventive flat surface C1, a reverse rotation allowing o convex surface C2 and a reverse rotation preventive flat surface C3, as shown in FIG. 8. The surface C1 can be put into contact with the operating portion 6b of the claw 6. The surface C3 can be put into contact with the operating portion F3 of the engagement member F, which is the end portion opposite from the tip portion F1. The surface C2 can be put into contact with the operating portions 6b and F3. The cam means C is secured to the manipulation bar 27 at the front end thereof. The stoppage knob 28 is secured to the bar 27 at the rear end thereof outside the casing 1.

FIG. 11 shows the reverse rotation preventive mechanism in the state that the knob 28 is put in the reverse rotation preventive position to engage the engagement part F2 of the engagement member F in the notch 9e of the engagement portion 9d of the housing 9, and engage the tip portion 6a of the claw 6 with the tooth of the ratchet 3 as well as shown in FIG. 9.

When the handle 12 is turned forward to wind a fishline on the spool 14 by the rotor 4 as the stoppage knob 28 is in the reverse rotation preventive position, the drive quill 2, the ratchet 3, the rotor 4, the flanged collar 28 and the inner race member 30 are rotated forward, i.e. clockwise as to FIG. 11. Because of the forward rotation of the inner race member 30, the rolling elements 31 of the clutch D are put on the free rolling areas α of the outer race member 32 to allow the rotor 4 to be rotated forward further. At that time, the housing 9 is not rotated because the engagement part F2 of the engagement member F is engaged in the notch 9e of the engagement portion 9d of the housing. Because of the forward rotation of the ratchet 3, the tip portion 6a of the engagement claw 6 of the second reverse rotation preventive means A is disengaged from the tooth of the ratchet through the action of the friction spring 18 or not engaged therewith owing to the configuration of the tooth, so that the rotor 4 is allowed to be rotated forward further.

When the fishline is thereafter unwound from the spool 14 by the pull of a fish so that the rotor 4 is rotated backward or reversely, i.e. counterclockwise as to FIG. 11, the quill 2, the ratchet 3, the collar 29 and the inner race member 30 are rotated backward or reversely, i.e. counterclockwise as to FIG. 11. Because of the backward or reverse rotation of the inner race member 30, the rolling elements 31 of the clutch D are moved from the free rolling areas α of the outer race member 32 onto the rolling hindrance areas β thereof to preclude the backward or reverse rotation of the inner race member relative to the outer race member by the wedge effects of the rolling elements to stop the backward or reverse rotation of the rotor 4. Since the quantity of the unavoidable backward or reverse rotation of the rotor 4 can be made extremely small by utilizing the wedge effects, the rotation is very quickly or simultaneously stopped when the reverse rotation occurs. Because of the backward or reverse rotation of the ratchet 3, the tip portion 6a of the claw 6 is engaged with the tooth of the ratchet 3 to stop the backward or reverse rotation of the rotor 4.

The stoppage of the backward or reverse rotation of the rotor 4 by the wedge effects of the rolling elements 31 of the clutch D takes place more quickly than the engagement of the tip portion 6a of the claw 6 with the ratchet 3. However, since the power of the stoppage by the wedge effects limited by the frictional resistance of the synthetic resin material formimg the clutch D, the rolling elements 31 slip in between the inner and the outer race members 30 and 31 if the power of the backward or reverse rotation of the rotor 4 is high. When the rotor 4 has been rotated backward or reversely by an angle due to the slip, the tip portion 6a of the claw 6 is engaged with the ratchet 3 to stop the backward or reverse rotation of the rotor. Thus, the backward or reverse rotation of the rotor 4 is stopped by the first reverse rotation preventive means B at the initial stage of the rotation. However, if the power of the rotation is too high for the first means B to stop it, the rotation is stopped after the initial stage thereof by the second reverse rotation preventive means A larger in unavoidable backward or reverse rotation allowance but higher in backward or reverse rotation stoppage power than the first means.

When the stoppage knob 28 is put in the reverse rotation allowing position as shown in FIG. 12, the reverse rotation allowing convex surface C2 of the cam means C pushes down the operating portions 6b and F3 of the claw 6 and the engagement member F so that the claw and the member are swung counterclockwise as to FIG. 12 to allow the rotor 4 to be freely rotated both forward and backward or reversely.

Figure 13:
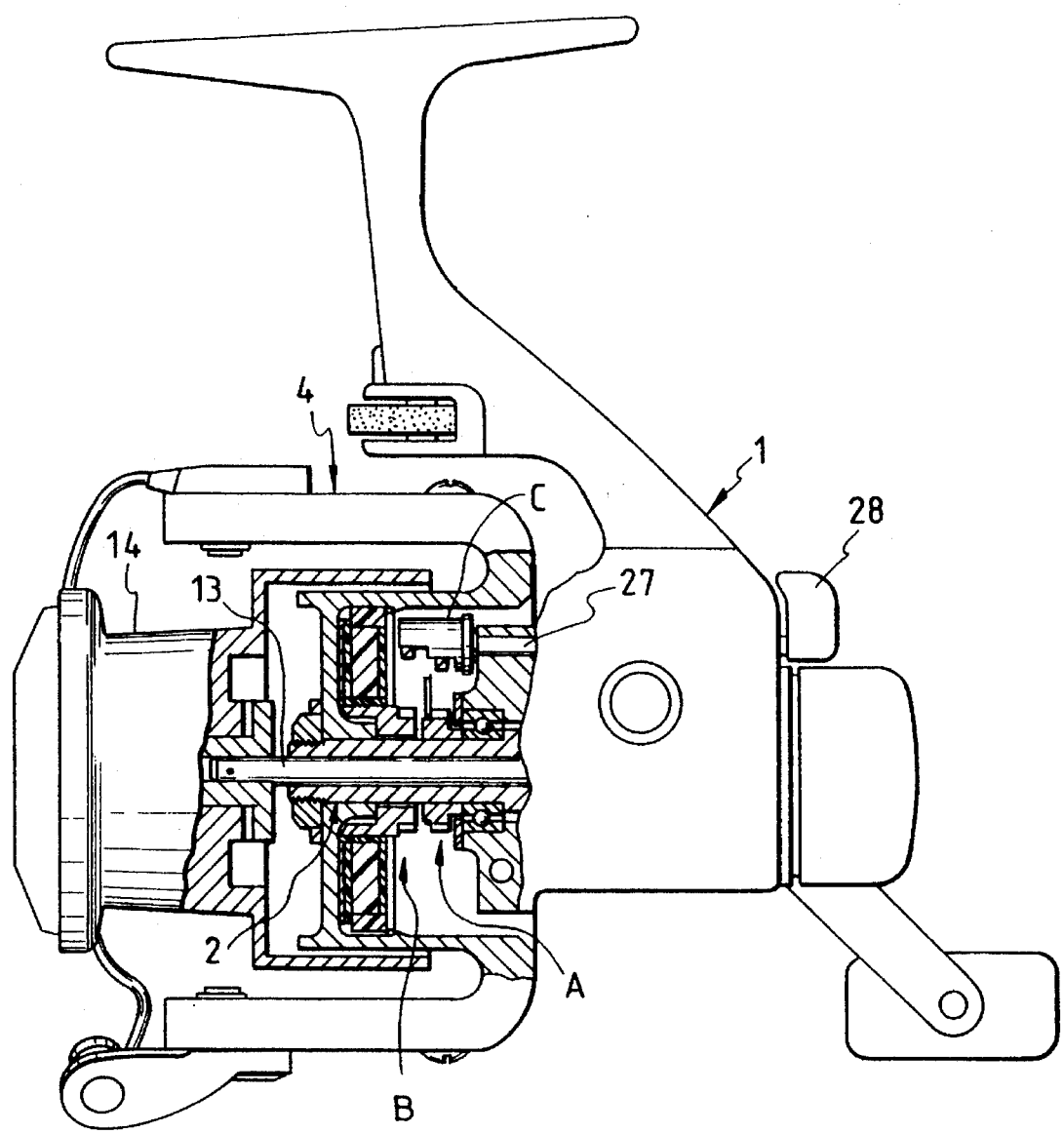
FIG. 13 is a cutaway side view of a spinning reel which is for fishing and includes a reverse rotation preventive mechanism which is yet another embodiment of the invention.
Figure 14:
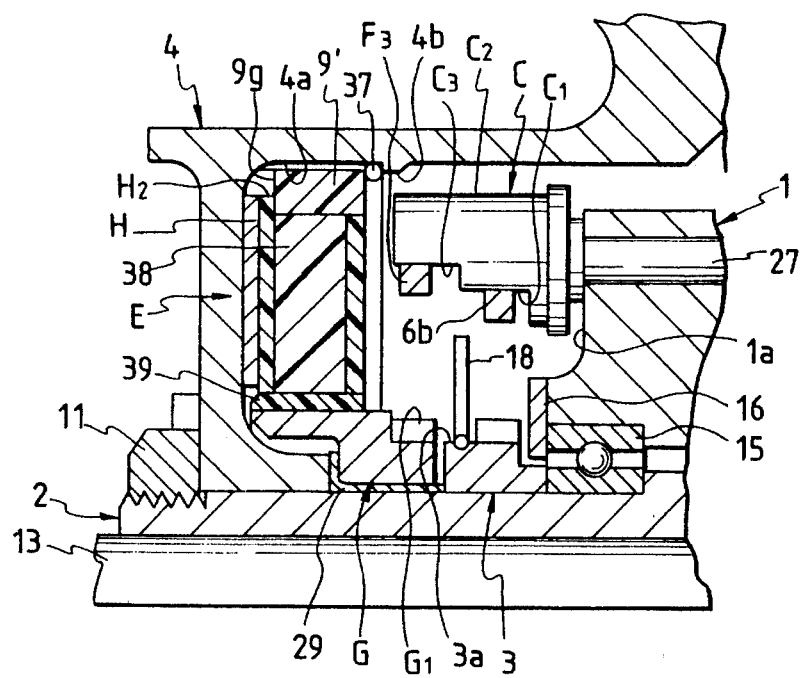
FIG. 14 is a longitudinally sectional view of a major of the reel.
Figure 15:
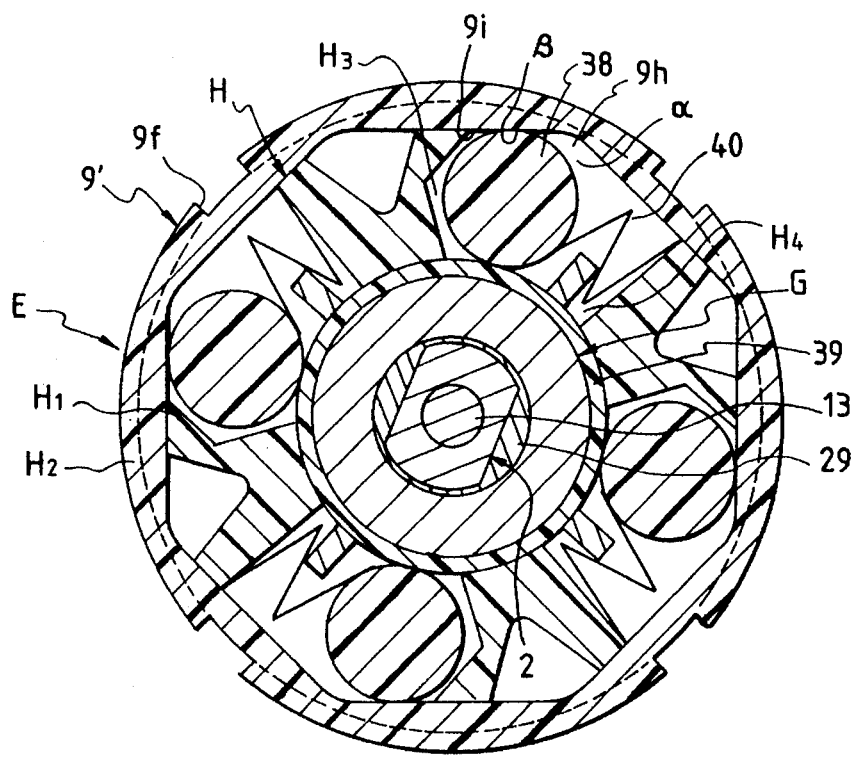
FIG. 15 is a cross-sectional view of the flat one-way clutch of the mechanism.

FIGS. 13, 14 and 15 show a reverse rotation preventive mechanism which is yet another of the embodiments and is for preventing the backward or reverse rotation of the rotor of a spinning reel for fishing. FIG. 13 is a cutaway side view of the reel. FIG. 14 is an enlarged longitudinally sectional view of a major part of the reel. FIG. 15 is a cross-sectional view of the flat one-way clutch of the mechanism.

The spinning reel includes a casing 1, a drive quill 2, the rotor 4, a drive gear 5, a nut 11, a handle 12, a spool shaft 13, a spool 14, a bearing 15, and a stop plate 16.

The reverse rotation preventive mechanism includes a first reverse rotation preventive means B, a second reverse rotation preventive means A, a cam means C, a manipulation bar 27, and a stoppage knob 28.

The drive quill 2 projects forward from the front portion 1a of the casing 1. The reverse rotation preventive ratchet 3 of the second reverse rotation preventive means A and the flanged collar 29 of the second reverse rotation preventive means B are mounted on the quill 2 in front of the casing 1 so that the ratchet and the collar are unrotatable to the quill. The rotor 4 is mounted on the quill 2 in front of the collar 29 so that the rotor is unrotatable relative to the quill. The nut 11 is tightened on the quill 2 and the rotor 4 to secure them to each other. The pinion 2a is provided on the quill 2 and engaged with the drive gear 5 so that the rotor 4 is rotated through the gear and the pinion by turning the handle 12. The spool shaft 13 is fitted in the quill 2, and projects forward therefrom. The spool 14 is mounted on the shaft 13 at the front end thereof so that the spool is unrotatable relative to the shaft, and they are reciprocated together backward and forward by turning the handle 12. The bearing 15 is mounted on the quill 2 and fitted in the front portion 1a of the casing 1 to support the quill. The stop plate 16 is secured to the front portion 1a in front of the bearing 15 to keep it from coming off.

The second reverse rotation preventive means A includes the reverse rotation preventive ratchet 3, a reverse rotation preventive engagement claw 6, an engagement plate 7, a friction spring 18, and a swing stoppage pin 19. The second reverse rotation preventive means A is similarly in construction to that of the second embodiment as best shown in FIG. 9. More specifically, the claw 6 is supported in a swingable manner by the screw 17 in the right half of the front portion 1a of the casing 1 so that the tip portion 6a of the claw is opposed to the tooth of the ratchet 3 and can be engaged therewith and disengaged therefrom. The friction spring 18 is fitted in the groove of the peripheral surface of the central portion 3a of the ratchet 3. The engagement plate 7 is provided on the claw 6. The spring 18 is fitted at one end thereof in the engagement opening 7a of the plate 7 so that the claw 6 is swung when the spring is rotated in the same direction as the rotor 4 along with the rotation thereof. The swing stoppage pin 19 is secured to the casing 1 near outside the tip portion 6a of the claw 6.

The first reverse rotation preventive means B includes the flat one-way clutch E, a reverse rotation preventive engagement member F corresponding to that F shown in FIG. 11, and a reverse rotation preventive member G for the clutch. The clutch E is made of a synthetic resin, and includes an outer race member 9', a retainer H, a plurality of disk-shaped rolling elements 38, an inner race member 39, and springs 40. The reverse rotation preventive member G is rotatably supported on the flanged collar 29. The inner race member 39 of the clutch E is mounted on the member G so that the race is unrotatable relative thereto. The member G has a reverse rotation preventive ratchet G1 corresponding to the engagement portion 9d shown in FIG. 11. The tip portion F1 of the reverse rotation preventive engagement member F is opposed to the tooth of the ratchet G1 so that the tip portion can be engaged therewith and disengaged therefrom.

The clutch E is provided in the inner recess 4a of the rotor 4 so that the projections of the rotor, which extend into the recess, are fitted in the grooves 9f of the outer race member 9' of the clutch, and a stop ring 37 which is a spring is fitted in between the outer race member and the other projection 4b of the rotor, which also extends into the recess, as shown in FIGS. 13 and 14. The outside circumferential surface of the outer race member 9' is substantially circular, while the inside circumferential surface thereof is octagonal. The peripheral surface of the side portion H1 of the retainer H is fitted on the inside circumferential surface of the outer race member 9', while the flange portion H2 of the retainer abuts against one side face 9g of the outer race member 9'. The inside circumferential surface of the outer race member 9' may be shaped as a regular polygon other than an octagon. The peripheral surface of the side portion H1 of the retainer H may be secured to the inside circumferential surface of the outer race member 9' by press-fitting or the like.

The disk-shaped rolling elements 38, the number of which is four in this embodiment, are fitted in the through holes H3 of the retainer H so as to be retained therein. The elements 38 are located on the outside circumferential surface of the inner race 39, and urged by the pushing forces of the springs 40. The inside circumferential surface of the retainer H is located on the outside circumferential surface of the inner race 39 to support the rolling elements 38. The curved portions 9h of the inside circumferential surface of the outer race 9' constitute free rolling areas on which the elements 38 freely roll, while the straight portions 9i of the surface constitute rolling hindrance areas with which the elements are put into contact to hinder their rolling. Each of the springs 40 is bent as "N", and has one side portion located on the peripheral surface of the corresponding rolling element 38, and another side portion fitted in the hole h4 of the retainer H.

The cam means C is virtually the same in constitution and operation as that C of the preceding embodiment. The first and the second reverse rotation preventive means B and A are virtually the same in operation as those B and A of the preceding embodiment.

Figure 16:
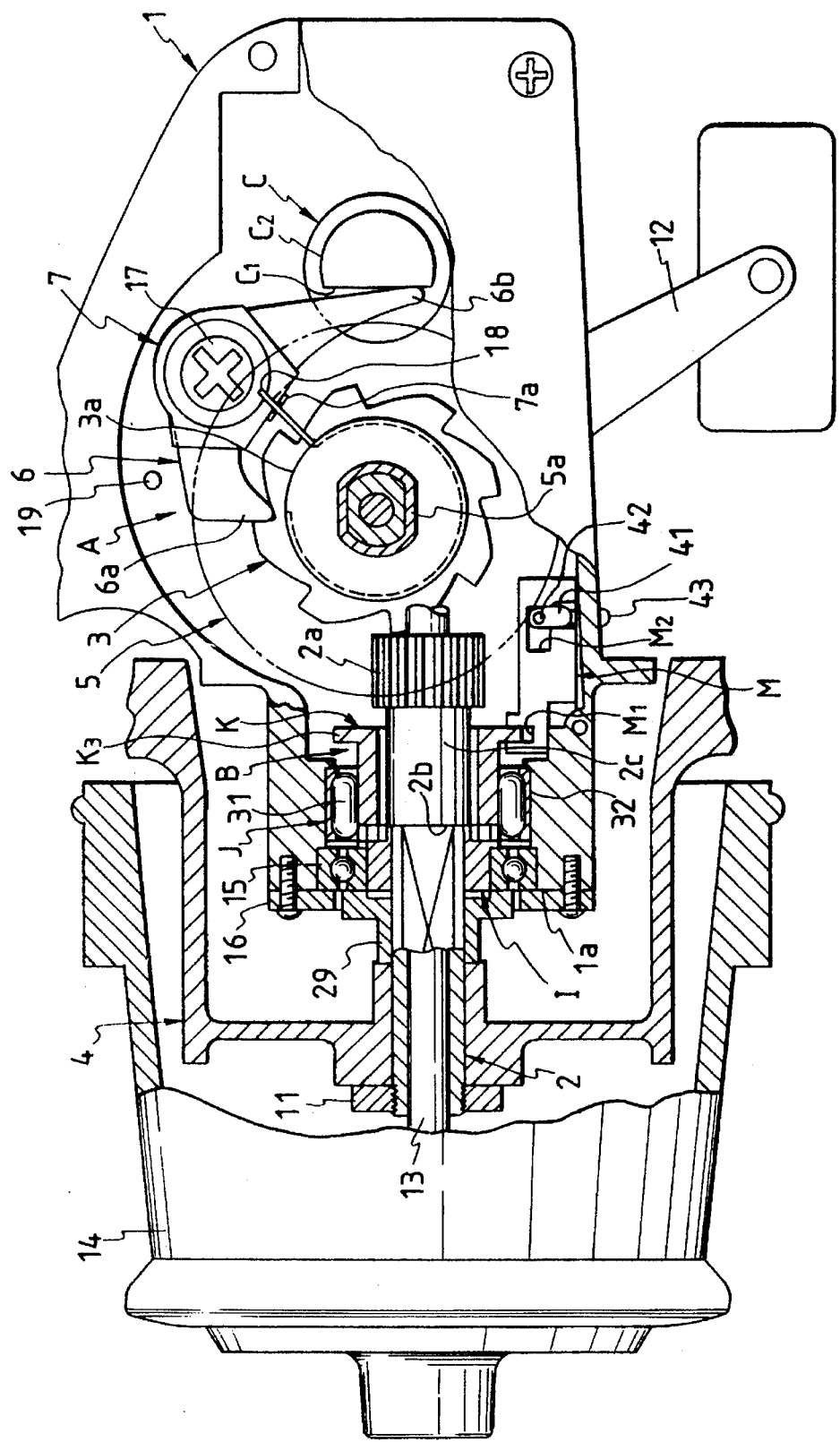
FIG. 16 is a cutaway side view of a spinning reel which is for fishing and includes a reverse rotation preventive mechanism which is yet another embodiment of the present invention.
Figure 17:
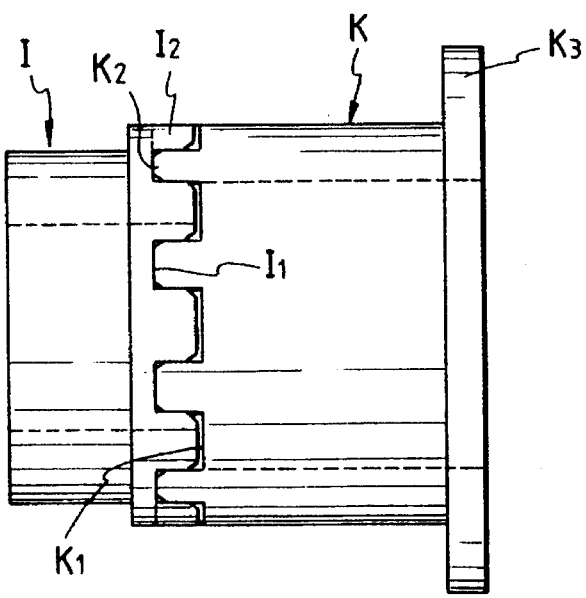
FIG. 17 is a side view of a changeover member on a rotation side and a changeover member on a manipulation side.
Figure 18:
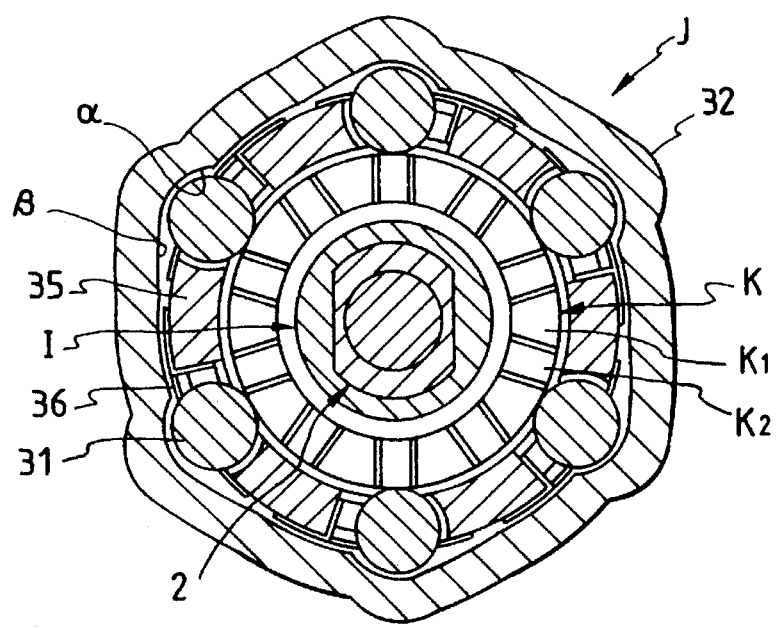
FIG. 18 is a cross-sectional view of a drive quill, the changeover members and a one-way clutch.
Figure 19:
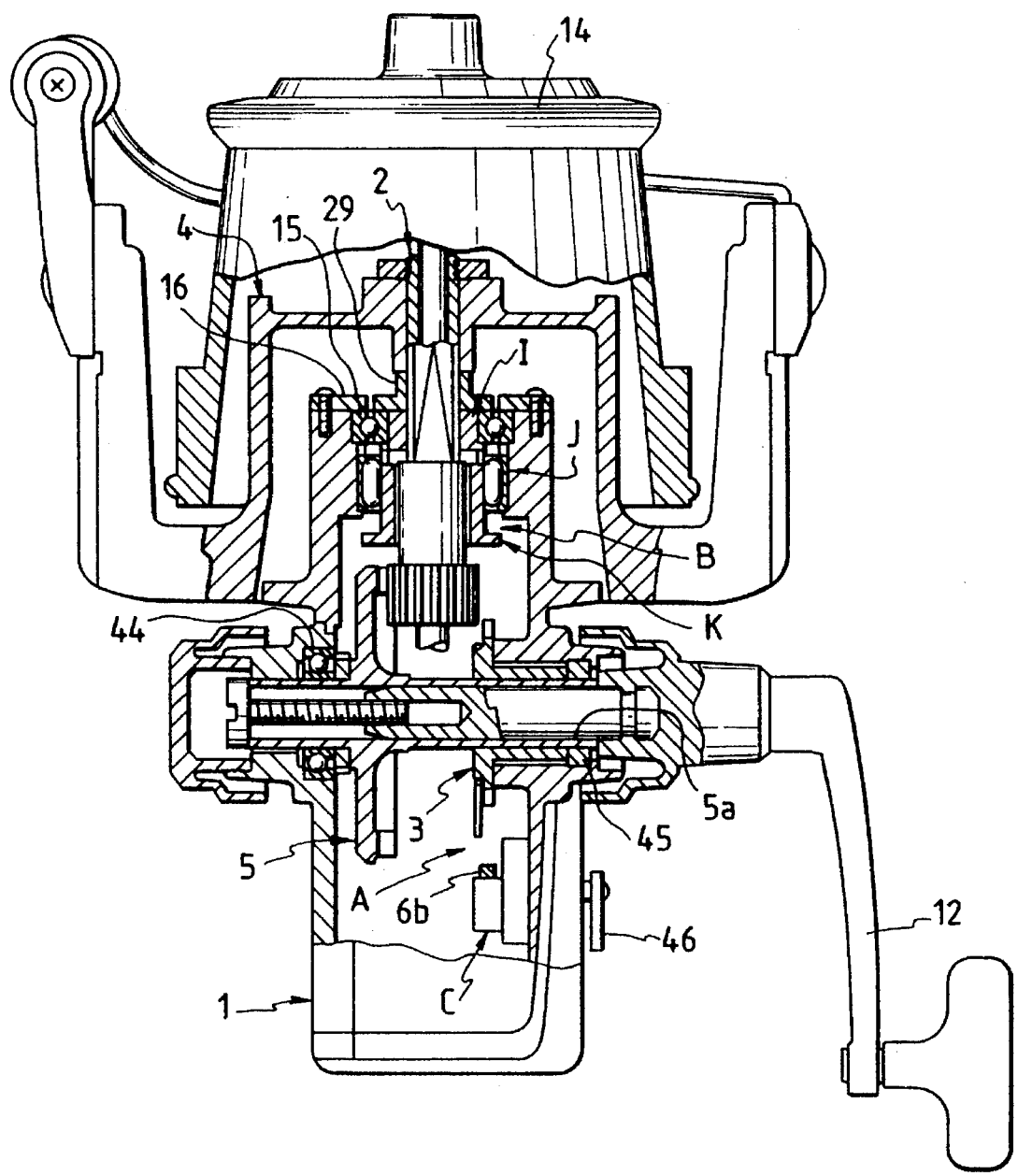
FIG. 19 is a cutaway plan view of the reel.

FIGS. 16, 17, 18 and 19 show a reverse rotation preventive mechanism which is yet another of the embodiments and is for preventing the backward or reverse rotation of the rotor of a spinning reel for fishing. FIG. 16 is a cutaway side view of the reel. FIG. 17 is a side view of a changeover member on a rotation side and a changeover member on a manipulation side. FIG. 18 is a cross-sectional view of a drive quill, the changeover members and a one-way clutch. FIG. 19 is a cutaway plan view of the reel.

The spinning reel includes a casing 1, the drive quill 2, a pinion 2a, the rotor 4, a drive gear 5, a nut 11, a handle 12, a spool shaft 13, a spool 14, a bearing 15, and bearings 44 and 45.

The reverse rotation preventive mechanism includes a first reverse rotation preventive means B, and a cam means C.

The drive quill 2 projects forward from the casing 1. The flanged collar 29 of the first reverse rotation preventive means B is fitted on the quill 2 in front of the casing 1. The rotor 4 is mounted on the quill 2 in front of the collar 29 so that the rotor is unrotatable relative to the quill. The nut 11 is tightened on the quill 2 and the rotor 4 to secure them to each other. The pinion 2a is provided on the quill 2 and engaged with the drive gear 5 so that the rotor 4 is rotated through the gear and the pinion by turning the handle 12. The spool shaft 13 passes through the quill 2, and projects forward therefrom. The spool 14 is mounted on the spool shaft 13 at the front end thereof so that they are reciprocated together backward and forward by turning the handle 12. The bearing 15 is mounted on the quill 2 and fitted in the front portion 1a of the casing 1 to support the quill. The stop plate 16 is secured to the front portion 1a in front of the bearing 15 to keep it from coming off.

The first reverse rotation preventive means B includes a rolling-element-type one-way clutch J, the changeover member I on the rotation side, the changeover member K on the manipulation side, a manipulation member M, the flanged collar 29, a cam 41, a cam rod 42, and a knob 43. The changeover member I on the rotation side is provided between the outside circumferential surface of the quill 2 and the inside circumferential surface of the bearing 15 and mounted on the former surface so that the member is unrotatable relative to the quill, and the step of the quill and the bearing keep the member from moving in the axial direction of the quill. The clutch J is fixedly fitted in the casing 1 behind the bearing 15. The clutch J is made of a synthetic resin, and includes a plurality of rod-shaped rolling elements 31, an outer race member 32, a retainer 35, and springs 36, as shown in FIGS. 16, 18 and 19. The changeover member K on the manipulation side is fitted inside the rolling elements 31 so that the member K is slidable in the axial direction of the quill 2. A gap is defined between the inside circumferential surface of the changeover member K and the outside circumferential surface of the thick portion of the quill 2.

The changeover member I on the rotation side has engagement openings I1 and engagement projections I2 at one end of the member. The projections I2 are chamfered at the corners thereof to have oblique facets. The changeover member K on the manipulation side has engagement openings K1 and engagement projections K2 at one end of the member. The projections K2 are chamfered at the corners thereof to have oblique facets. The member K has a flange K3 at the other end of the member. The manipulation member M is shaped as a plate, and provided under the flange K3, and has an opening M1 and a cam opening M2. The flange K3 is inserted in the opening M1. The cam 41 is provided in the cam opening M2, and secured to the cam rod 42 projecting out of the casing 1. The knob 43 is attached to the cam rod 42 at the outer end thereof, and provided with a click means not shown in the drawings.

The rod-shaped rolling elements 31, the number of which is six in this embodiment, are fitted in the through holes of the retainer 31 of the clutch J, located on the outside circumferential surface of the changeover member K on the manipulation side, and urged by the pushing forces of the springs 36. The inside circumferential surface of the outer race member 32 of the clutch has free rolling areas α on which the rolling elements 31 freely roll, and rolling hindrance areas β with which the elements are put into contact to hinder their rolling.

The drive gear 5 has a quill 5a supported by the bearings 44 and 45 on the casing 1, as shown in FIG. 19.

The second reverse rotation preventive means A includes a reverse rotation preventive ratchet 3 equivalent to that 3 shown in FIGS. 1 and 2, a reverse rotation preventive engagement claw 6 equivalent to that 6 shown in FIGS. 3 and 5, an engagement plate 7, a friction spring 18, a swing stoppage pin 19, and a knob 46. The ratchet 3 is mounted on the quill 5a so that the ratchet is unrotatable relative thereto. The claw 6 is supported in a swingable manner by a screw 17 in the casing 1 so that the tip portion 6a of the claw is opposed to the tooth of the ratchet 3 and can be engaged therewith and disengaged therefrom. The friction spring 18 is fitted in the groove of the peripheral surface of the central portion 3a of the ratchet 3. The engagement plate 7 is provided on the claw 6. The spring 18 is fitted at one end thereof in the engagement opening 7a of the plate 7 so that the claw 6 is swung when the spring is rotated in the same direction as the drive gear 5 along with the rotation thereof. The swing stoppage pin 19 is secured to the casing 1 near outside the tip portion 6a of the claw 6.

The cam means C equivalent to that C shown in FIGS. 1 and 2 is provided in the casing 1, and includes a reverse rotation preventive flat surface C1 and a reverse rotation allowing convex surface C2, either of which can be put into contact with the operating portion 6b of the claw 6. A shaft is coupled to the cam means C, and projects out of the casing 1. The knob 46 is attached to the shaft at the outer end thereof, and provided with a click means not shown in the drawings. Although the knobs 43 and 46 are provided to manipulate the manipulation member M and the cam means C, respectively, the present invention is not confined thereto but may be otherwise constructed so that a single knob is provided to manipulate both the member M and the cam means C.

When the handle 12 is turned forward to wind a fishline on the spool 14 by the rotor 4 as the engagement openings I1 and K1 and engagement projections I2 and K2 of the changeover members I and K of the first reverse rotation preventive means B remain engaged with each other as shown in FIG. 17 and the operating portion 6b of the reverse rotation preventive engagement claw 6 of the second reverse rotation preventive means A is on the reverse rotation preventive flat surface C1 of the cam means C, the drive quill 2, the rotor and the changeover members are rotated forward clockwise as to FIG. 18 and the reverse rotation preventive ratchet 3 and the drive gear 5 are rotated forward counterclockwise as to FIG. 16. Because of the forward rotation of the changeover member K, the rolling elements 31 of the one-way clutch J are put on the free rolling areas α of the outer race 32 so that the changeover member is allowed to be rotated forward further.

When the fishline is thereafter unwound from the spool 14 by the pull of a fish, the rotor 4 is rotated backward or reversely to rotate the changeover member K backward or reversely counterclockwise as to FIG. 18 to move the rolling elements 31 of the clutch from the free rolling areas α onto the rolling hindrance areas β. As a result, the backward or reverse rotation of the changeover member K relative to the outer race 32 of the clutch is simultaneously hindered by the wedge effects of the rolling elements 31 to stop the backward or reverse rotation of the rotor 4. Since the quantity of the unavoidable backward or reverse rotation of the rotor 4 is minimized due to the wedge effects of the rolling elements 31, the rotation is stopped very quickly. Since the tip portion 6a of the claw 6 of the second reverse rotation preventive means A remains engaged with the ratchet 3 thereof throughout the unwinding of the fishline, the backward or reverse rotation of the rotor 4 is also stopped by the means as the ratchet is rotated backward or reversely clockwise as to FIG. 16 due to the rotation of the rotor.

The stoppage of the backward or reverse rotation of the rotor 3 by the wedge effects of the rolling elements 31 takes place more quickly than the engagement of the tip portion 6a of the claw 6 with the tooth of the ratchet 3. However, since the power of the stoppage by the wedge effect is not set high, the rolling elements 31 slip between the changeover member K and the outer race member 32 if the power of the backward or reverse rotation of the rotor 4 is high. When the rotor 4 has been rotated backward or reversely by an angle due to the slip, the tip portion 6a of the claw 6 is completely engaged with the tooth of the ratchet 3 to stop the backward or reverse rotation of the rotor surely. Thus, the backward or reverse rotation of the rotor 4 is stopped by the first reverse rotation preventive means B at the initial stage of the rotation. If the power of the rotation is too high for the first means B to stop it, the rotation is stopped after the initial stage thereof by the second reverse rotation preventive means A larger in unavoidable backward or reverse rotation allowance but higher in backward or reverse rotation stoppage power than the first means.

When the knob 43 of the first reverse rotation preventive means B is out in a reverse rotation allowing position to disengage the engagement openings I1 and K1 and engagement projections I2 and K2 of the changeover members I and K from each other by the manipulation member M not to transmit the rotation of the drive quill 2, the rotor 4 and changeover member I to the other changeover member K and the one-way clutch J, the quill, the rotor and the former changeover member are allowed to be rotated both forward and backward or reversely if the knob 46 of the second reverse rotation preventive means A remains put in a reverse rotation allowing position to push down the operating portion 6b of the claw 6 by the reverse rotation allowing convex surface C2 of the cam means to allow the quill 5a of the drive gear 5, the quill and the rotor to be rotated both forward and backward or reversely.

The present invention is not confined to the embodiments, but may be otherwise constructed so that the clutch J and the ratchet 3 are provided at the quill 5a of the gear 5 and the drive quill 2, respectively in the last embodiment, or/and balls are provided instead of the rod-shaped or disk-shaped rolling elements. Besides, the present invention may be applied to a fishing reel other than a spinning reel. The one-way clutch utilizing wedge effects may be made of metal and constructed so that its rotation hinderance resistance is set relatively low.

A reverse rotation preventive mechanism provided for a spinning reel in accordance with the present invention includes a first reverse rotation preventive means small in unavoidable reverse rotation allowance but low in reverse rotation stoppage power, and a second reverse rotation preventive means large in unavoidable reverse rotation allowance but high in reverse rotation stoppage power. The reverse rotation of the rotor of the reel is hindered by the first reverse rotation preventive means at the initial stage of the rotation so as to quickly stop it to avoid the loosening of a fishline to improve the hooking property of the reel. Even if the power of the reverse rotation is too high for the first reverse rotation preventive means to stop it, the rotation is surely stopped by the second reverse rotation preventive means after the initial stage of the rotation. The first reverse rotation preventive means is lower in weight and cost than a reverse rotation preventive means having steel-made rolling members whose wedge effects are utilized for the prevention of reverse rotation.

What is claimed is:

1. A reverse rotation preventive mechanism for a fishing reel having a body and a rotary member rotatably supported on said body, said mechanism comprising:

first preventive means for permitting said rotary member to rotate in a first direction relative to said body and preventing said rotary member from rotating relative thereto in a second direction opposite to said first direction when rotational torque exerted on said rotary member in said second direction is below a predetermined value, said first preventive means including a roller-type one-way clutch having an inner race member, and outer race member, and a plurality of roller members interposed between said inner and outer race members, wherein at least one of said inner race member, outer race member, and roller members is formed of synthetic resin whereby said rotary member rotates in said second direction against a frictional resistance of said first preventive member when said rotational torque exceeds said predetermined value; and a second preventive means for permitting said rotary member to rotate in said first direction relative to said body and preventing said rotary member from rotating in said second direction relative thereto when said rotational torque exceeds said predetermined value.

2. The mechanism according to claim 1, wherein said second preventive means includes a rachet and a claw engageable with said rachet.

3. The mechanism according to claim 1, further comprising:

first shift means for shifting said first preventive means between a first state in which said first preventive means permits said rotary member to rotate in either of said first and said second directions, and a second state in which said first preventive means permits said rotary member to rotate in said first direction and prevents said rotary member from rotating in said second direction when said rotational torque is below a predetermined value.

4. The mechanism according to claim 3, further comprising:

second shift means for shifting said second preventive means between a third state in which said second preventive means permits said rotary member to rotate in either of said first and second directions, and a fourth state in which said second preventive means permits said rotary member to rotate in said first direction and prevents said rotary member from rotating in said second direction regardless of the magnitude of said rotational torque.

5. The mechanism according to claim 4, wherein if said first and second preventive means are shifted into said second and third states, respectively, the rotation of said rotary member in said second direction is permitted while being braked by said first preventive means when said rotational torque exceeds said predetermined value.

6. The mechanism according to claim 4, wherein if said first and second preventive means are shifted into said first and fourth states, respectively, the rotation of said rotary member in said second direction is prevented by said second preventive means.

7. The mechanism according to claim 1, wherein said fishing reel includes a spool and a rotor for winding a fishline onto said spool, said rotor forming a part of said rotary member.

8. A reverse rotation preventive mechanism for a spinning reel having a body, a spool supported to said body, and a rotor rotatable relative to said body to wind a fishline onto said spool, said mechanism comprising:

first preventive means for permitting said rotor to rotate in a first direction relative to said body and preventing said rotor from rotating relative thereto in a second direction opposite to said first direction when rotational torque exerted on said rotor in said second direction is below a predetermined value; and first shift means for shifting said first preventive means between a first state in which said first preventive means permits said rotor to rotate in either of said first and second directions, and a second state in which said first preventive means permits said rotor to rotate in said first direction and prevents said rotor from rotating in said second direction when said rotational torque is below a predetermined value;

wherein said first preventive means comprises a roller-type one-way clutch formed at least in part of synthetic resin material which, when in said second state, permits said rotor to rotate in said second direction when said rotational torque exceeds said predetermined value.

9. The mechanism according to claim 8, further comprising:

second preventive means for permitting said rotor to rotate in said first direction relative to said body and preventing said rotor from rotating in said second direction relative thereto when said rotational torque exceeds said predetermined value; and second shift means for shifting said second preventive means between a third state in which said second preventive means permits said rotor to rotate in either of said first and second directions, and a fourth state in which said second preventive means permits said rotor to rotate in said first direction and prevents said rotor from rotating in said second direction regardless of the magnitude of said rotational torque.

10. The mechanism according to claim 9, wherein if said first and second preventive means are shifted into said second and third states, respectively, the rotation of said rotor in said second direction is permitted while being braked by said first preventive means when said rotational torque exceeds said predetermined value.

11. The mechanism according to claim 9, wherein if said first and second preventive means are shifted into said first and fourth states, respectively, the rotation of said rotor in said second direction is prevented by said second preventive means.

* * * * *